(12) United States Patent
Yano et al.

(10) Patent No.: US 6,754,255 B1
(45) Date of Patent: Jun. 22, 2004

(54) MOBILE TERMINAL, A BASE STATION, AND A SYNCHRONIZATION CONTROL METHOD

(75) Inventors: Takashi Yano, Tokorozawa (JP); Takaki Uta, Kokubunji (JP); Nobukazu Doi, Hachioji (JP); Toshiro Suzuki, Tama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/516,205

(22) Filed: Feb. 29, 2000

(30) Foreign Application Priority Data

Mar. 3, 1999 (JP) .......................................... 11-055424

(51) Int. Cl.[7] ................................................. H04B 1/69
(52) U.S. Cl. ...................... 375/149; 375/148; 375/152
(58) Field of Search ................................. 375/130, 143, 375/145, 147, 149, 150, 152, 148, 142, 144; 370/331, 342, 441

(56) References Cited

U.S. PATENT DOCUMENTS

| | | | |
|---|---|---|---|
| 4,122,393 A | | 10/1978 | Gordy et al. |
| 4,538,281 A | | 8/1985 | Rajan |
| 5,414,729 A | * | 5/1995 | Fenton ........................ 375/149 |
| 5,533,047 A | | 7/1996 | Mourot et al. |
| 5,590,160 A | | 12/1996 | Ostman |
| 5,940,433 A | * | 8/1999 | Sawahashi et al. .......... 375/149 |
| 6,009,118 A | * | 12/1999 | Tiemann et al. ............. 375/150 |
| 6,028,887 A | * | 2/2000 | Harrison et al. ............. 375/147 |
| 6,154,487 A | * | 11/2000 | Murai et al. ................. 375/150 |
| 6,167,037 A | * | 12/2000 | Higuchi et al. .............. 370/335 |
| 6,347,113 B1 | * | 2/2002 | Hatch ........................... 375/149 |

FOREIGN PATENT DOCUMENTS

| | | |
|---|---|---|
| EP | 782295 | 7/1997 |
| EP | 818892 | 1/1998 |
| JP | 9321664 | 12/1997 |

\* cited by examiner

*Primary Examiner*—Tesfaldet Bocure
(74) *Attorney, Agent, or Firm*—Antonelli, Terry, Stout & Kraus, LLP (57) ABSTRACT

In a mobile communication system, the tracking of synchronization is conducted in a stable state even in a multipath environment. A delay profile detector calculates a delay profile a(n) using a despread signal for each processing unit n. A delay profile averaging unit averages a(n) to produce $\text{Ave}(|a(n)|^2)$. A data symbol detector conducts rake combining of the despread signal using a(n) and $\text{Ave}(|a(n)|^2)$. According to a(n) and $\text{Ave}(|a(n)|^2)$, a weighting function unit calculates a representative value representing delay waves. A loop filter generates a control signal in response to the representative value. A clock controller controls a spread code generator according to the control signal.

25 Claims, 6 Drawing Sheets

MOBILE TERMINAL, A BASE STATION, AND A SYNCHRONIZATION CONTROL METHOD

CROSS-REFERENCE TO RELATED APPLICATION

This application relates to U.S. patent application Ser. No. 09/124,233, filed on Jul. 29, 1998, now U.S. Pat. No. 6,256,341, the contents of which is incorporated herein by reference.

BACKGROUND OF THE INVENTION

1. Field of the Invention

The present invention relates to a mobile communication system, and in particular, to a receiver, a mobile terminal, a base station, and a synchronization control method for use therewith.

2. Description of the Related Art

A code division multiple access (CDMA) scheme is a scheme in which a plurality of communication channels are multiplexed and are used for multiple accesses using a spectrum spreading code and hence has attracted attentions as a scheme to remarkably improve efficiency of frequency utilization. In a system using the CDMA, a transmission side multiplexes signals on channels necessary for communication such as a perch channel, a common control channel, a dedicated control channel, and a dedicated traffic channel by conducting a spectrum spreading modulation respectively with different spreading codes for the channels and transmits spread signals. On receiving the spread signals, a reception side despreads the signals with the spreading code used on the transmission side to demodulate a signal on a desired channel among the multiplexed signals. The signals modulated in the spectrum spreading modulation on the transmission side can be demodulated on the reception side only when both sides use the same spreading code and the same code phase. Therefore, an operation to establish synchronization and an operation to conduct tracking of synchronization on the reception side are regarded as essentially important techniques to implement the CDMA system. In the description, "synchronization establishing operation" indicates detection of a code phase of a spreading code used on the transmission side and "tracking of synchronization" means keeping a code phase established.

In a phase to establish synchronization, a mobile terminal conducts a search for perch channels which the base stations around the terminal transmit. The perch channel includes information of a spreading code used by the base station and information necessary for power control to transmit them to the mobile terminal. The perch channel is almost continuously used by all base stations to send signals. A concrete method of establishing synchronization has been described in pages 57 to 63 of "Fast Cell Search Algorithm using Long Code Masking in DS-CDMA Asynchronous Cellular System" written by Kenichi Higuchi, Kyoei Sawa, and Bunkoh Adachi in IEICE Technical Report RCS96-122, 1997-01.

The reason why the synchronization establishing and the tracking of synchronization are regarded as important is difficulty in the implementation of these operations as follows. In an actual propagation route, a propagation delay occurs in proportion to length of the route. Therefore, the code phase of the spreading code used on the reception side must be set to a value obtained by adding a phase shift associated with the propagation delay to the code phase on the transmission side. Furthermore, since the radio wave reflects at many places to arrive at the reception side through various paths, there appear a plurality of delayed waves. This phenomenon is generally called "multipath". Since the multipath brings about a plurality of received signal components having different phases on the reception side, the operation to establish synchronization and the synchronization tracking become difficult.

In the CDMA communication system, a rake receiving technique is employed to cope with the multipath. In the rake receiving technique, the delayed waves are separately demodulated with code phases corresponding to respective delay time of the waves, and resultant signals are combined with each other to obtain the diversity effect and a combined gain. To conduct the rake reception, it is required to simultaneously despread the received signal components having different phases. A technique of the prior art to implement the operation above is an invention of a matched filter described in JP-A-9-321664 entitled "Spread Spectrum, Rake Receiver Using Time Window Control Loop". In the invention, despreading of a plurality of signals is simultaneously carried out with a plurality of spreading codes which are shifted by a fixed phase interval. In the matched filter, the despreading is accomplished in a predetermined phase range beginning at a code phase beforehand set. A time width corresponding to the predetermined phase range will be referred to as "time window" of the matched filter herebelow.

Figure 14:
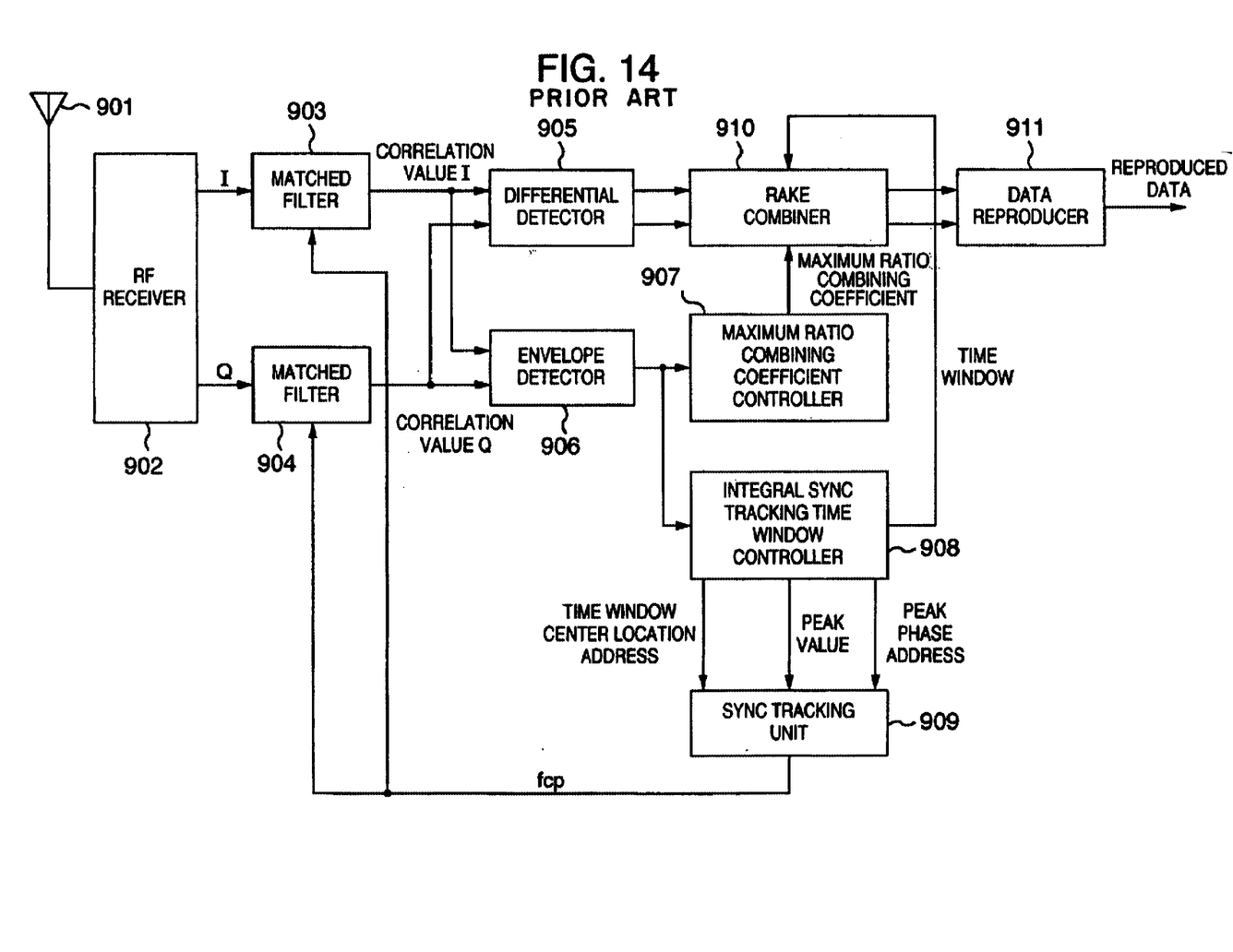
FIG. 14 is a block diagram showing a configuration of a spread spectrum receiver of the prior art.

FIG. 14 shows a configuration diagram of a spread spectrum receiver of the related art. According to the related art, for a signal received by a radio frequency (RF) receiver 902, despread results corresponding to a plurality of code phases detected by matched filters 903 and 904 are inputted to an envelope detector 906 and a differential detector 905. For an output from the envelope detector 906, a maximum ratio combining controller 907 determines intensity of the despread results. According to the intensity of reception, signals detected by the differential detector 905 are combined with each other in a rake combining unit 910 to thereby achieve the rake reception. On the other hand, according to a result outputted from the envelope detector 906, a time window controller 908 and a sync tracking unit 909 control a time window location of the matched filters 903 and 904 such that a maximum peak position of an envelope aligns at a time window center location of the matched filters 903 and 904. Using an output from rake combining unit 910, a data reproducing unit 911 reproduces data.

In the related art, when there exist a plurality of delayed waves and there appear a plurality of correlation values corresponding to the respective waves, synchronization is aligned to one of the delayed waves which has a largest correlation value. Therefore, it can be expected in the related art that the tracking of synchronization is appropriately conducted only when a delayed wave having dominant intensity exists in a stable state among the delayed waves. However, in an actual environment, for example, in an urban environment, there exist many delayed waves and the respective delayed waves are not clearly different from each other in intensity in many cases. Moreover, fading is caused by movement of the mobile terminal and the respective delay waves strongly change in intensity depending on cases. As a result, the delayed wave having the largest correlation value frequently changes. Consequently, it is difficult in the related art to specify an appropriate code phase to be used for the tracking of synchronization.

In such an environment, received power is dispersed to the respective delayed waves and hence power per delayed wave is lowered. When either one of the delayed waves (paths) is selected for the tracking of synchronization, the overall received power can be only partly used for the tracking of synchronization and hence satisfactory stability cannot obtained.

SUMMARY OF THE INVENTION

It is therefore an object of the present invention to provide a synchronization control method, a receiver, a base station, and a mobile terminal which are particularly used in a CDMA mobile communication system and in which a state of out of synchronism is minimized and hence radio waves can be received in a stable state.

Another object of the present invention is that the tracking of synchronization is conducted in a stable state even in an environment such as an urban environment including a multipath and resultantly reduces the probability of call disconnection during a speech.

Further another object of the present invention is that a high-speed acquisition is conducted in an initial acquisition of synchronization and jitter due to noise is kept minimized after completion of the acquisition to stabilize the tracking of synchronization.

Still another object of the present invention is to minimize a period of time from when a terminal is powered to when the terminal is available for a speech and to reduce deterioration of speech quality due to phase jitter.

To solve the problem above in accordance with the present invention, the time window location of the matched filter is not aligned with a single path. Namely, a control operation is accomplished such that the time window location of the matched filter is aligned with a representative value which represents code phases corresponding to a plurality of paths for which valid correlational values have been detected and which represents spreading code phases of a plurality of paths obtained according to the respective correlational values. As the representative value, it is favorable to employ, for example, a center of path power.

In accordance with a first aspect of the present invention, there is provided a synchronization control method, comprising the steps of obtaining, according to a correlation between a received spread spectrum signal and an inputted spreading code, a delay profile including as elements thereof respective correlation values of a plurality of code phases, conducting a rake combining of despread signals according to the obtained delay profile and producing a decoded signal, calculating a representative value representing spreading code phases of a plurality of paths according to a plurality of correlation values and code phases thereof obtained from the delay profile obtained, and conducting a control operation for a tracking of synchronization between the received signal and the spreading code according to the calculated representative value.

In accordance with a second aspect of the present invention, there is provided a receiver including an input unit for producing a despread signal according to a correlation between a received spread spectrum signal and an inputted spreading code, a delay profile detector for producing a delay profile for the despread signal from the input unit, a data symbol demodulator for conducting a rake combining, according to the delay profile produced from the profile detector, for the despread signal from the input unit and producing a decoded signal; a representative value calculating unit for calculating, according to the delay profile produced from the profile detector, a representative value representing spreading code phases of a plurality of paths using a plurality of correlation values and code phases corresponded thereto, and a clock control unit for achieving a control operation to conduct a tracking of synchronization, according to the representative value from the representative value calculating unit, between the received signal inputted to the input unit and the spreading code.

In accordance with a third aspect of the present invention, there is provided a base station and a mobile terminal each including the receiver described above.

BRIEF DESCRIPTION OF THE DRAWINGS

The objects and features of the present invention will become more apparent from the consideration of the following detailed description taken in conjunction with the accompanying drawings in which.

DESCRIPTION OF THE EMBODIMENTS

Figure 1:
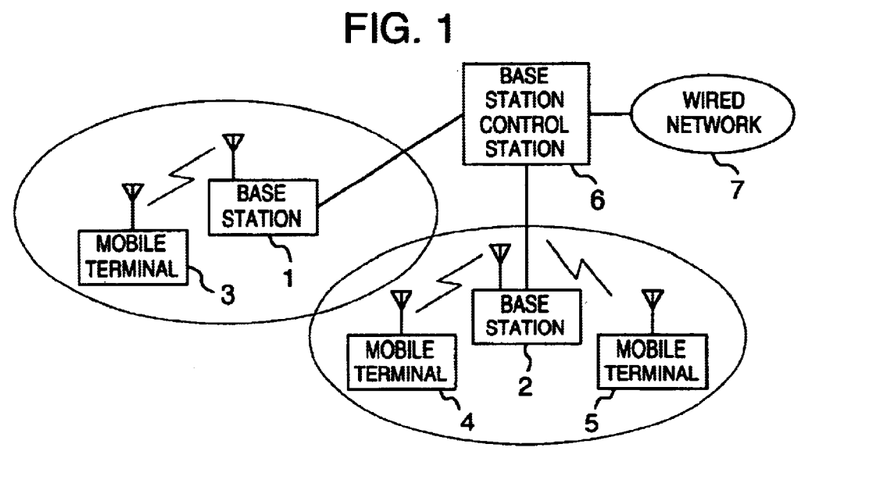
FIG. 1 is a diagram showing a configuration of a CDMA mobile communication system in accordance with the present invention.

FIG. 1 shows in a block diagram a configuration of a CDMA mobile communication system in accordance with the present invention. In this system, base stations 1 and 2 are arranged respectively in fixed service areas, and mobile terminals 3 to 5 in the service areas communicate using spectrum spread signals with nearby base station 1 or 2. Base stations 1 and 2 are connected to a base station control station 6. Station 6 is linked with a fixed network 7 and the like. Fixed network 7 is further coupled with another wired network, a wireless network, and the like. As a result, the mobile terminal in the service area can conduct a conversation with a mobile terminal under control of the same base station, a mobile terminal under control of another base station, and a terminal connected to the wired network or the like.

Figure 2:
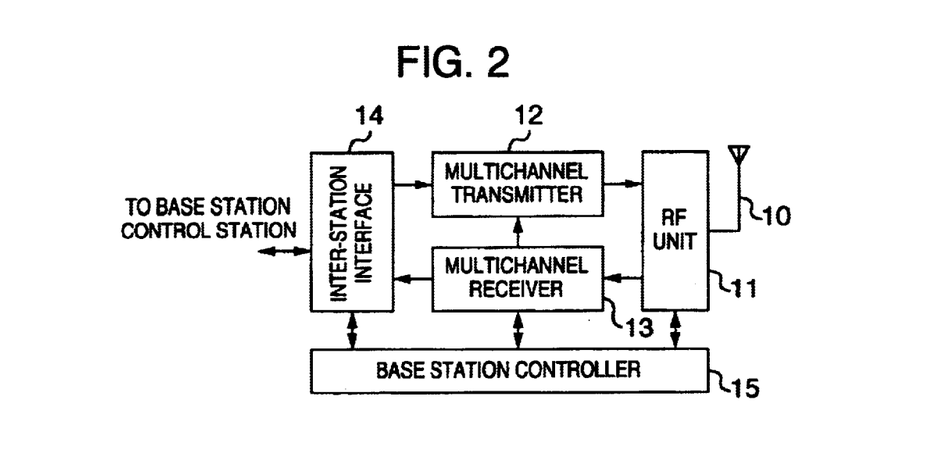
FIG. 2 is a block diagram showing a configuration of a base station.

FIG. 2 shows in a block diagram a structure of a base station. The base station includes an antenna 10, an RF (Radio Frequency) unit 11, a multichannel transmitter 12, a multichannel receiver 13, an inter-station interface 14, and a base station controller 15. A radio wave communicated with a mobile terminal passes through antenna 1 and RF unit 11 such that a signal conversion is mutually achieved between the wave and communication signals in a base band. Transmitter 12 modulates baseband transmission signals of a plurality of channels. On the other hand, receiver 13 demodulates received baseband signals of a plurality of channels. Interface 14 communicates with the base station control station a signal to be sent from transmitter 12, a signal demodulated by receiver 13, and various control signals. Base station control station 15 controls each unit of the base station.

Figure 3:
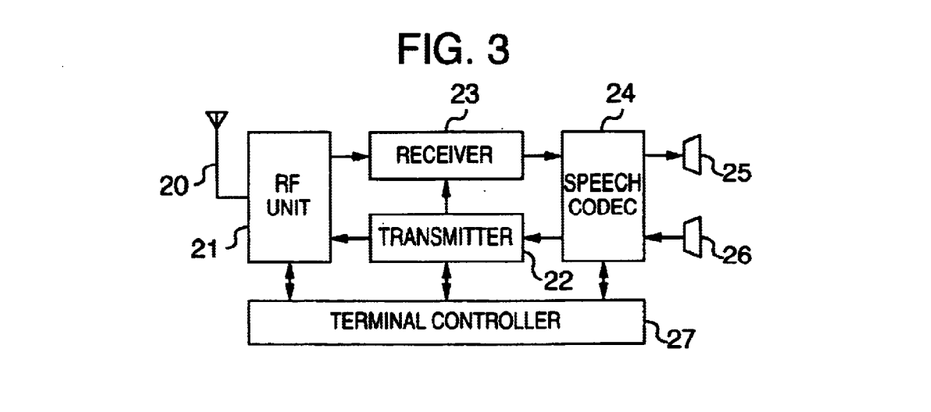
FIG. 3 is a block diagram showing a configuration of a mobile station.

FIG. 3 shows in a block diagram a construction of a mobile terminal. The mobile terminal includes an antenna 20, an RF unit 21, a transmitter 22, a receiver 23, a speech coder decoder (CODEC) 24, an ear receiver 25, a mouthpiece 26, and a terminal controller 27. A radio wave send to and received from a base station passes through antenna 20 and RF unit 21 such that signals are mutually converted between the wave and communication signals in a base band.

Transmitter 22 modulates baseband transmission signals. Receiver 23 demodulates received baseband signals. Speech CODEC 24 encodes a speech signal from mouthpiece 26 to produce a signal transmitting to transmitter 22 and decodes a signal demodulated by receiver 23 to output a resultant signal to ear receiver 25. Terminal controller 27 controls each unit of the mobile terminal.

Figure 4:
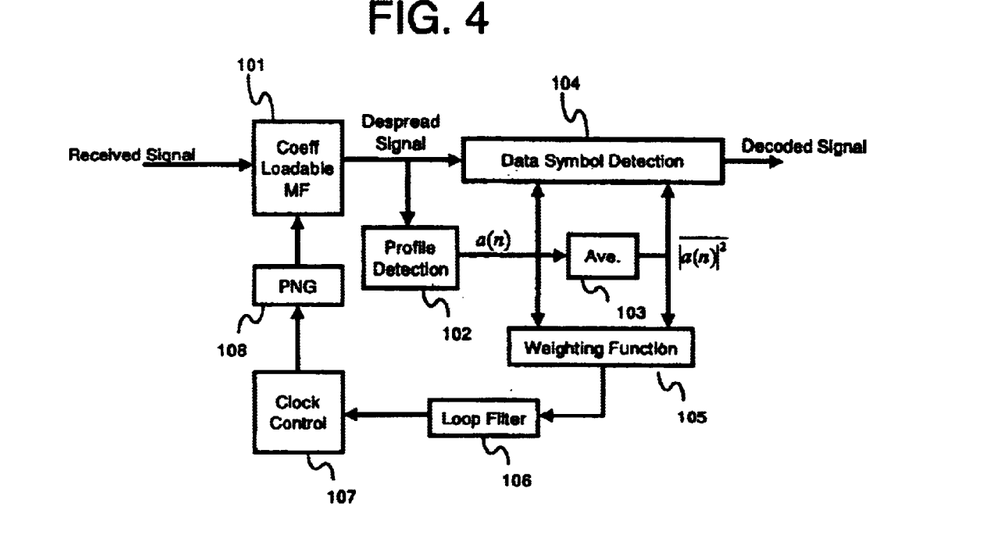
FIG. 4 is a block diagram showing a configuration of a receiving module (receiver) in accordance with the present invention.

FIG. 4 shows in a block diagram a configuration of a receiving module (receiver) in accordance with the present invention.

The module includes a coefficient loadable matched filter (input unit, despreading unit) 101, a delay profile detector 102, a delay profile averaging unit 103, a data symbol detector 104, a weighting function unit (representative path timing calculation unit) 105, a loop filter 106, a clock controller 107, and a pseudo-noise (spreading code) generator (PNG) 108. In this connection, it is possible to use as unit 101 an appropriate despreading unit which produces a despread signal according to a correlation between a spectrum-spread received signal and an inputted spreading code. In accordance with the present invention, receiver 23 of the mobile terminal shown in FIG. 3 includes a receiving module shown in FIG. 4. Multichannel receiver 13 of the base station shown in FIG. 2 includes a plurality of receiving modules shown in FIG. 4.

The received signal is inputted to matched filter 101 to which a code from spreading code generator 108 is already set such that a correlation is calculated between the spreading code and the received signal to produce a despread signal. For the despread signal, profile detector 102 produces a delay profile. The delay profile indicates a sequence of correlation values (despread results) obtained for a plurality of code phases. It is assumed that a correlation value for code phase n is expressed as $a(n)$. When a delayed wave exists for code phase n, n indicates a value representing a path location in a time window of the matched filter. The path location is a location at which a correlation value of a delayed wave is obtained in the time window of the matched filter, namely, a value indicating a code phase. More specifically, assuming that the window of the matched filter has a width of $2w$ and a code phase interval is d, n satisfies $-w<n<w$ and $n=j \cdot d$ (j is an integer.). Moreover, n takes a value of 0 at a center of the window. When interval d is represented by a chip unit of spreading code, d may indicate one chip or a half chip. However, interval d is appropriately set to a quarter chip in consideration of demodulation characteristics. Profile is averaged with respect to time by averaging unit 103 for each code phase n to obtain $Ave(|a(n)|^2)$. For the average, there may be used another mean value such as $Ave(|a(n)|)$ or $Ave(|a(n)|^N)$, where N is a real number. Data symbol detector 104 conducts detection and rake combining for the despread signal using the delay profile (a sequence of $a(n)$) and the time-averaged delay profile (sequence of $Ave(|a(n)|^2)$ to produce a demodulated signal.

On the other hand, the delay profile and the time-averaged delay profile are also inputted to unit 105 to calculate a representative value such as a center of path power. The representative value is calculated, for example, as follows.

$$\Sigma_n(|a(n)|^2 \cdot n)/(\Sigma_n Ave|a(n)|^2)$$

In place of $a(n)$, there may be employed an appropriate item such as $|a(n)|^N$.

The representative value can be more generally attained as follows. An evaluation value $f(n,a(n))$ obtained for one code phase n as a function of code phase n and a correlation value $a(n)$ is calculated for a plurality of code phases n for which valid correlation values have been detected, and obtained evaluation values are combined with each other. The valid correlation values indicate correlation values corresponding to paths (delayed waves) effective to track synchronization and can be defined, for example, as correlation values having intensity exceeding a predetermined threshold value. However, more simply, all correlation values may be regarded as valid correlation values. For the function $f(n,a(n))$ of code phase n and correlation value $a(n)$, it is desired that a stronger path more contributes to the control of the synchronization tracking and a shift direction of a path location is detectable. Therefore, $f(n,a(n))$ is desirably a function which uniformly changes with respect to change of magnitude $|a(n)|$ of correlation value $a(n)$; moreover, an odd function having a window center as an axis of symmetry for code phase n. However, the function is not restricted by these examples and can be arbitrarily selected within a range in which the control system is kept stable. In the description, "which uniformly changes with respect to change of correlation value $a(n)$" means that function value $f(n,a(n))$ increases or is kept unchanged or function value $f(n,a(n))$ decreases or is kept unchanged when correlation value $a(n)$ increases. Additionally, "an odd function having a window center as an axis of symmetry for code phase n" indicates that when the function has a positive value for certain code phase, the function takes a negative value with the same absolute value for a symmetrical code phase with respect to the window center. For example, assume that the code phase is 0 at a location corresponding to the time window center of the matched filter and the code phase is $-32$ and 32 at both ends of the time window and the correlation value corresponding to code phase n is $a(n)$. Function $f(n,a(n))$ may be expressed as $n \cdot a(n)^2$ or may be an appropriate function such as $f(n,a(n))=n \cdot a|n|$, $f(n,a(n))=sgn(n) \cdot a(n)$, $f(n,a(n))=sgn(n) \cdot a(n)^2$, or $f(n,a(n))=n^3 \cdot a(n)^2$, where $sgn(n)$ is a function representing a sign of n. In a most simple situation, there may be employed, for example, a function which produces $-1$ and $+1$ for paths respectively earlier than and later than the window center of the matched filter.

The representative value is inputted to loop filter 106. Filter 106 then smoothes instantaneous fluctuation of path locations caused by noise or the like according to the representative value to produce a clock control signal. The control signal is fed to clock controller 107. Controller 107 then controls a clock signal to be supplied to spreading code generator 108. Resultantly, the spreading code fed to matched filter 101 is made through a feedback control operation to synchronize with the received input signal. That is, when a timing shift takes place between the spreading code supplied to filter 101 and the input received signal, the unit 105 produces the representative value according to a quantity of the timing shift. Moreover, loop filter 106 controls, according to the representative value, clock controller 107 in a direction reverse to the timing shift. By this control operation, the code phase of the input received signal matches that of the spreading code to be used for the despreading. As a result, the code phase is kept synchronized therebetween.

Figure 5:
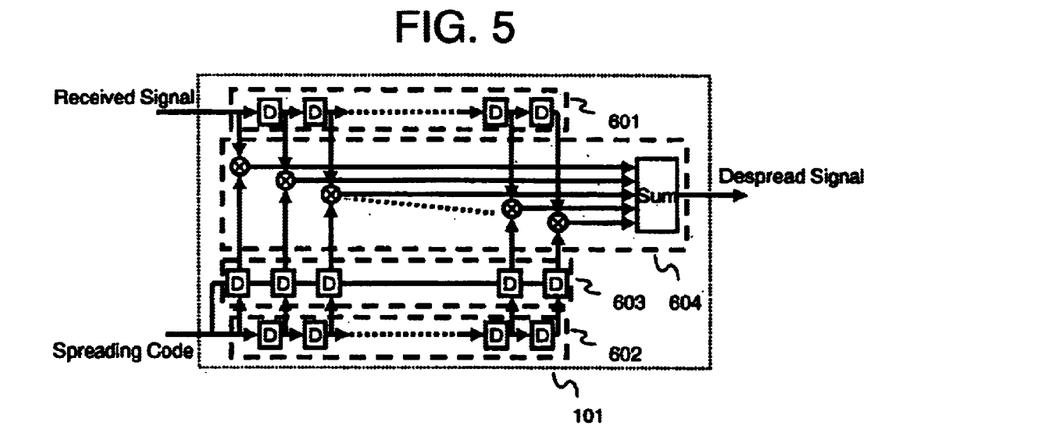
FIG. 5 is a diagram showing a configuration of matched filter 101.

Subsequently, description will be given in detail of each constituent element of the receiving module (receiver). FIG. 5 shows an example of a configuration of despreading unit 101. Unit 101 includes shift registers 601 and 602, a spreading code holding register 603, and a correlation calculating unit 604.

A received signal is inputted to shift register 601 to be held therein for a predetermined period of time. On the other hand, a spreading code from spreading code generator 108 is deliver to shift register 602 to be kept therein for a predetermined period of time and is thereafter transferred to register 603.

The received signal of the predetermined period of time stored in register 601 is inputted to correlation calculating unit 604. Unit 604 calculates a correlation between the received signal and the spreading code of the predetermined period of time stored in register 603. In the operation, a large correlation value is attained when timing of the received signal kept in register 601 matches the spreading code held in register 603. In an environment including a plurality of delayed paths, correlation values are obtained for a plurality of timing.

Figure 6:
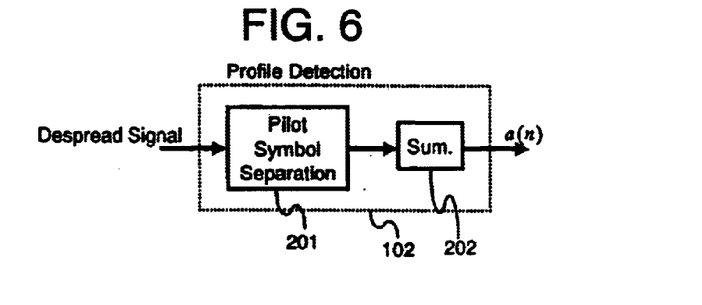
FIG. 6 is a block diagram showing a configuration of profile detector 102.
Figure 7:
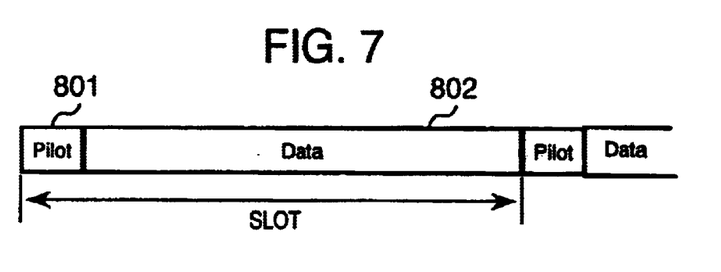
FIG. 7 is a diagram showing a format layout of a received signal.
Figure 8:
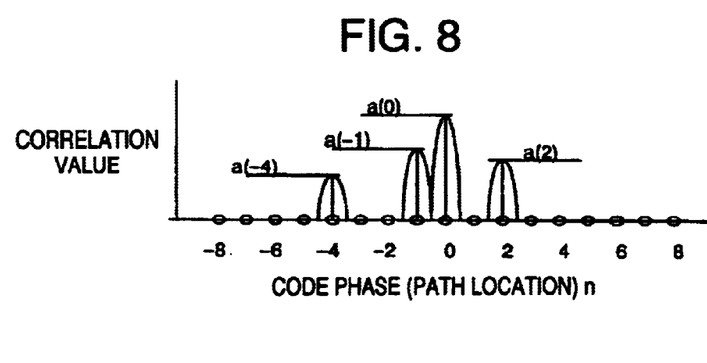
FIG. 8 is a graph for explaining a delay profile.

FIG. 6 shows an example of a configuration of profile detector 102, FIG. 7 shows an example of a format layout of a received signal, and FIG. 8 shows in a graph an example of a delay profile. Profile detector 102 includes a pilot symbol separator 201 and a pilot symbol summer 202. The received signal includes, for example, slots in a multiplexed configuration. Each slot includes a pilot symbol 801 as a reference signal and data symbol 802 as shown in FIG. 7. Separator 201 of FIG. 6 extracts only a despread result corresponding to symbol 801 of FIG. 7. Summer 202 adds the despread results to each other for a plurality of pilot symbol intervals to calculate delay profile a(n). FIG. 8 shows delay profile a(n) obtained as an average for a period of one pilot block. The averaging with respect to time is not limited to one pilot block, but may be conducted for a period of an appropriate number of blocks. FIG. 8 shows an example in which at code phases of −4, −2, 0, and 2 in the window of matched filter 101, there exist four paths associated with correlation values of a(−4), a(−2), a(0), and a(2) having respective intensity.

Figure 9:
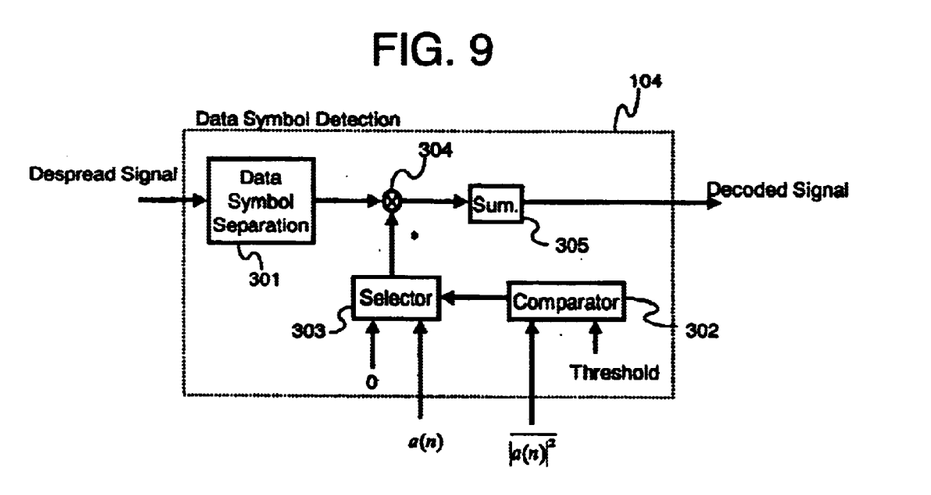
FIG. 9 is a block diagram showing a configuration of data symbol detector 104.

FIG. 9 shows in a configuration diagram an example of data symbol detector 104. Detector 104 includes a data symbol separator 301, a comparator 302, a selector 303, a multiplier 304, and a summer 305. Comparator 302 compares a sequence of correlation values Ave($|a(n)|^2$) averaged with respect to time by averaging unit 103 with a predetermined threshold value. The threshold value is obtained, for example, by multiplying by a constant a value obtained by averaging Ave($|a(n)|^2$) with respect to n. According to a result of the comparison, selector 303 selects and outputs correlation value a(n) from the delay profile obtained by detector 102 when Ave($|a(n)|^2$) is equal to or more than the threshold value. Conversely, when Ave($|a(n)|^2$) is less than the threshold value, selector 303 selects and outputs 0 therefrom. Separator 301 separates data symbol 802, for example, from the received signal shown in FIG. 7. In the detection, symbol 802 is multiplied in complex representation in multiplier 304 by a complex conjugate of an output from selector 303. By the operation above, the detected data is obtained only for code phase n for which a path having high intensity in average exists. 0 is obtained for other code phases n. Summer 305 accumulates the detected results for a period of the time window width of the matched filter to obtain a decoded result in which the signals of respective paths are combined with each other.

Figure 10:
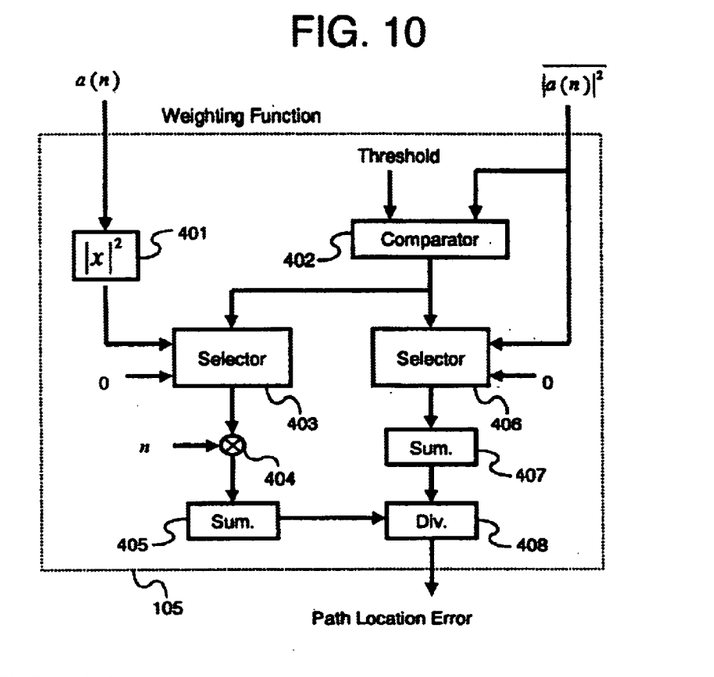
FIG. 10 is a block diagram showing a configuration of weighting function unit 105.

FIG. 10 shows an example of a configuration of weighting function (representative value calculation) unit 105. This diagram shows a configuration example when a center of path power is used as the representative value. Unit 105 includes a square unit 401, a comparator 402, selectors 403 and 406, a multiplier 404, summers 405 and 407, and a divider 408. The delay profile (a sequence of a(n)) obtained by detector 102 is inputted to square unit 401. Unit 401 squares an absolute value thereof to produce a delay profile in the power order (a sequence of $|a(n)|^2$). Comparator 402 compares the delay profile (a sequence of Ave($|a(n)|^2$) averaged with respect to time by averaging unit 103 with a predetermined threshold value. The threshold value is, for example, a value obtained by multiplying by a constant a value obtained by averaging Ave($|a(n)|^2$) with respect to n. Selector 403 selects and outputs therefrom $|a(n)|^2$ obtained by square unit 401 when Ave($|a(n)|^2$) is equal to or more than the threshold value. When Ave($|a(n)|^2$) is less than the threshold value, selector 403 selects and outputs 0 therefrom. The signals selected by selector 403 are multiplied in multiplier 404 by values n corresponding to respective path locations to produce path location information weighted by path intensity. The information is accumulated by summer 405.

Selector 406 selects, in response to a result of comparison by comparator 402, and outputs therefrom Ave($|a(n)|^2$) when Ave($|a(n)|^2$) is equal to or more than the threshold value. When Ave($|a(n)|^2$) is less than the threshold value, selector 406 selects and outputs 0 therefrom. The signals selected by selector 406 are added to each other by summer 407 to calculate the total power of all paths. On the other hand, the signal accumulated in the summer 405 is divided in divider 408 by the total power calculated by summer 407 to produce a center of power of all paths. In this example, the total power value employed as a divisor in divider 408 is obtained using the total sum of the delay profile (sequence of Ave($|a(n)|^2$) averaged with respect to time, not using the total sum of the delay profile (sequence of $|a(n)|^2$) in the power order. It is therefore possible to reduce influence of phase information with lower reliability when the intensity of all paths is instantaneously minimized.

Although detector 104 of FIG. 9 and unit 105 of FIG. 10 employ, to detect a path having high intensity in average, power averaged at respective path locations n, it is also possible to use another index such as a signal-to-interface ratio (SIR).

Figure 11:
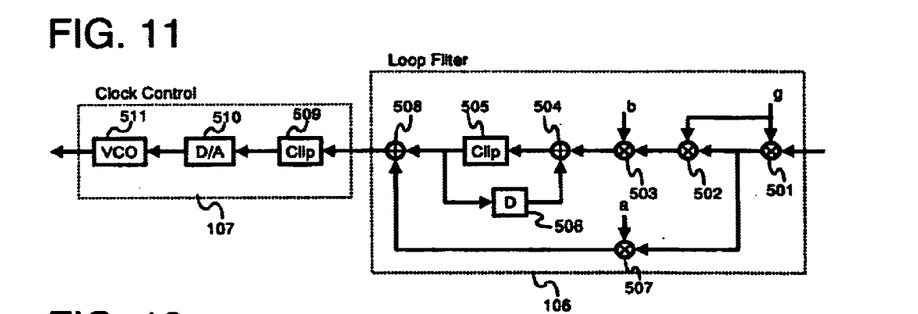
FIG. 11 is a diagram showing a configuration of loop filter 106 and clock controller 107.

FIG. 11 shows an example of structure of loop filter 106 and clock controller 107. Filter 106 includes multipliers 501, 502, 503, and 507, adders 504 and 508, a clipping unit 505, and a delay unit 506. A representative value as an output from unit 105 is multiplied by a first coefficient g in multiplier 501. An output from multiplier 501 is again multiplied by first coefficient g in multiplier 502. An output from multiplier 502 is then multiplied by a second coefficient b in multiplier 503. An output from multiplier 503 is integrated by an integrator including adder 504 and units 505 and 506. Clipping unit 505 limits an integrated value within a predetermined value range. The output from multiplier 501 is also inputted to multiplier 507 to be multiplied by a third coefficient a. An output from multiplier 507 is added by adder 508 to an output from an integrator including adder 504 and units 505 and 506 to produce a clock control signal.

Clock controller 107 includes a clipping unit 509, a digital-to-analog (D/A) converter 510, and a voltage controlled oscillator 511. In clock controller 107, the clock control signal from loop filter 106 is limited by unit 509 to a value within a predetermined value range and is then converted by D/A converter 510 into a frequency control voltage. The control voltage is applied to oscillator 511. According to the control voltage, oscillator 511 outputs a signal with an appropriate oscillation frequency.

Figure 12:
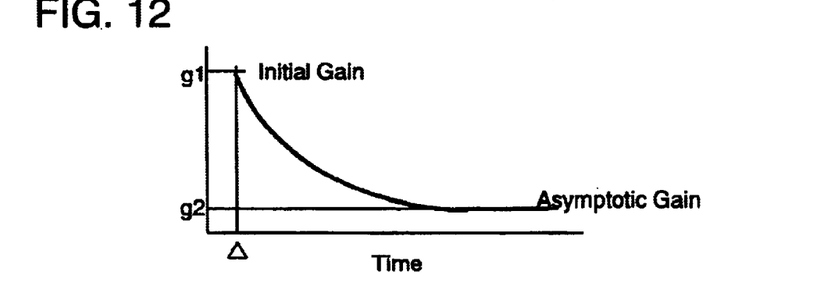
FIG. 12 is a graph for explaining control of loop filter coefficients.

Subsequently, description will be given of control of the loop filter coefficient in loop filter 106. FIG. 12 shows in a graph a control operation of the loop filter coefficient. As described above, the loop filter 106 can continuously change the loop bandwidth of the control system while keeping stability of the control system by changing first coefficient g. In general, when the loop bandwidth becomes greater, the tracking speed is increased, but stability against noise is lowered. Conversely, when the bandwidth becomes smaller, stability against noise is increased, but the tracking speed is lowered. Consequently, when loop filter 106 is configured, for example, as shown in FIG. 11 and a control operation is conducted such that the value of g is increased at initial synchronization tracking and is decreased g during communication after acquisition of synchronization, a high-speed initial acquisition characteristic and a stable synchronization tracking characteristic are both accomplished. However, when first coefficient g is abruptly reduced, it takes a long time to absorb influence of noise accumulated in the integrator including adder 504 and units 505 and 506, and the influence of noise remains for a long period of time in some cases. Therefore, it is desirable to smoothly reduce first coefficient g. For this purpose, as shown in the example of FIG. 12, the value of g is set to g1 for the initial acquisition and is thereafter exponentially lowered toward g2.

As above, in accordance with the present invention, even in an unstable propagation environment in which a plurality of delayed waves frequently vary in level and/or appearance and disappearance of such waves occur repeatedly, power of all delayed waves within the window width of matched filter 101 can be always used for the tracking of synchronization and hence it is possible to conduct the tracking of synchronization in a stable state.

The present technique is applicable to a base station and a mobile terminal. In the mobile terminal, it is possible that unit 105, filter 106, clock controller 107, and the like are arranged in each demodulator or these circuits can be appropriately used commonly in the overall apparatus. In the base station, it is possible that clock controller 107 and the like are individually arranged in each demodulator or the circuits are appropriately shared by the demodulators. In place of controller 107 shown in FIG. 5, a clock source and a variable frequency divider having a variable frequency divisor may be employed to supply a divided clock signal to generator 108. In this configuration, the clock can be controlled for each demodulator using a clock source shared in the overall apparatus.

In the embodiment above, an event of out of synchronism may occur in an environment having a delay deviation larger than the window width of the matched filter. Assume that, for example, there exist two paths having almost the same intensity of reception. When the delay between these paths gradually increases, these paths possibly reach the associated ends of the window to finally come out of the window, which causes the out of synchronism. A first method to prevent this event is to detect the path using a minimized window width. When a ratio of power of paths existing in the minimized window to power of the paths within the original window becomes less than or equal to a predetermined value, it is determined that a countermeasure is necessary to prevent the state of out of synchronism. When the countermeasure is necessary as a result, the tracking of synchronization on either one of the paths, i.e., the path on the window end or the path in the proximity of the window end is abandoned. Namely, the tracking of synchronization is conducted only with one path to thereby prevent occurrence of the out of synchronism. A second method is that delay deviation is detected in addition to the center of path power. When the delay deviation exceeds a predetermined value, it is determined that a countermeasure is necessary to prevent the state of out of synchronism. Also in this case, the tracking of synchronization on either one of the paths is abandoned as above to carry out the tracking of synchronization only with one path to thereby prevent the out of synchronism.

Figure 13:
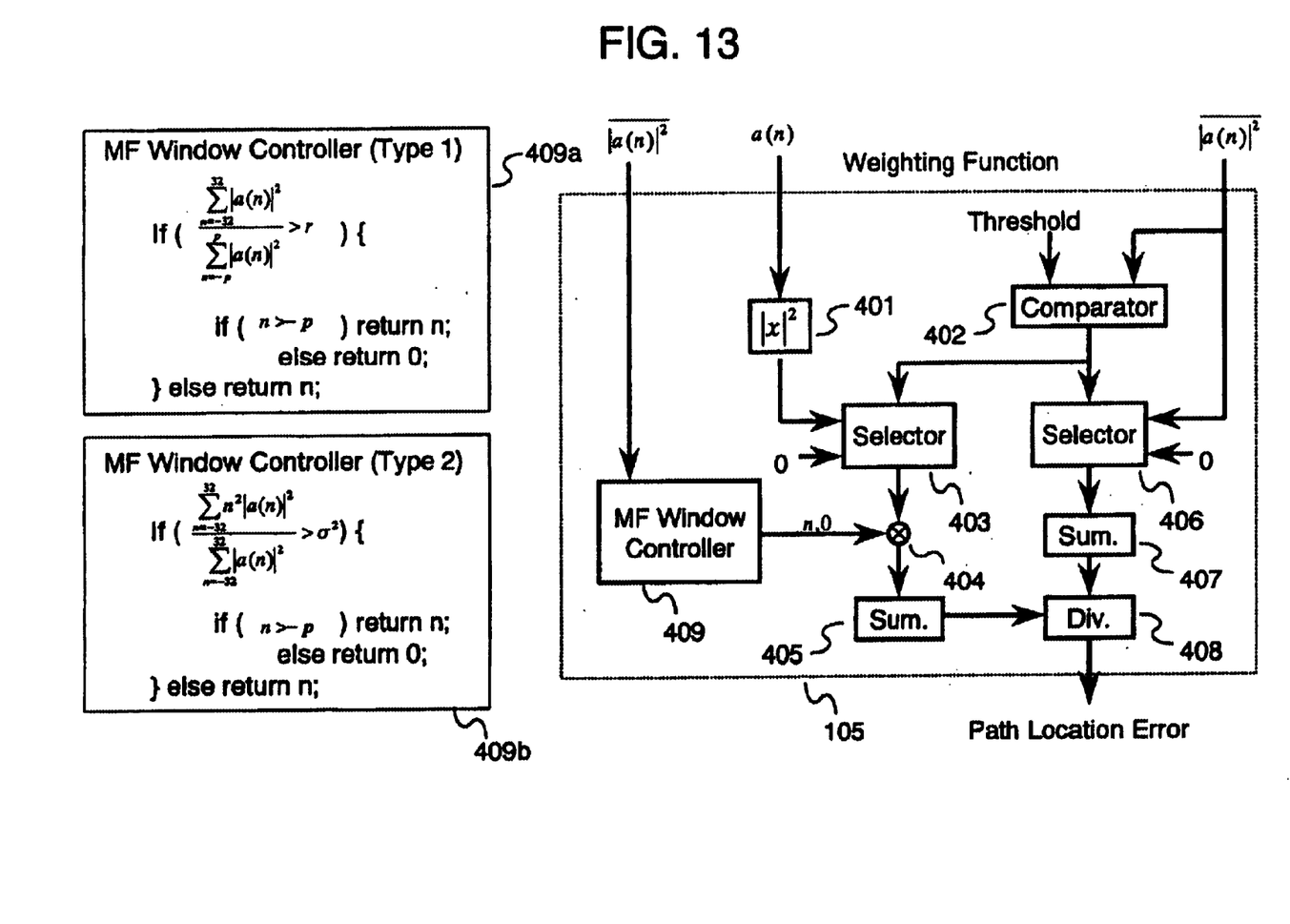
FIG. 13 is a block diagram showing another configuration of weighting function unit 105.

The first and second methods can be achieved, for example, in the configuration shown in FIG. 13. Operation of constituent elements 401 to 408 is substantially same as that of FIG. 10. A matched filter window controller 409 checks to determine, using the time-averaged delay profile (sequence of $Ave(|a(n)|^2)$, whether or not a countermeasure is necessary to prevent occurrence of the out of synchronism. According to a result of the check, controller 409 outputs code phase n of the spreading code or a time width center phase value (e.g., 0 for n=−32 to 32).

In the first method, controller 409 determines the output value according to an algorithm 409a (MF window controller (type 1) in FIG. 13). In the second method, controller 409 determines the output value in accordance with an algorithm 40b (MF window controller (type 2) in FIG. 13). For example, for n=−32 to 32, a one-side minimized window width p, a power ratio threshold r, delay deviation threshold $\sigma^2$ are constants in value ranges of 0<p<32, 1<r, and 0<σ<32, respectively.

In accordance with the present invention, even in an environment such as an urban environment in which a multipath exists due to many reflected waves, the tracking of synchronization can be conducted in a stable state and hence the probability of call disconnection during a speech is lowered. Furthermore, in accordance with the present invention, the acquisition of synchronization is carried out at a high speed in an initial acquisition of synchronization. After completion of the acquisition of synchronization, jitter caused by noise is kept reduced to thereby achieve the tracking of synchronization in a stable state. As a result, in accordance with the present invention, the period of time from when a terminal is powered to when the terminal is available for a speech can be reduced. Moreover, it is possible to minimize deterioration of speech quality due to phase jitter.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mobile terminal, comprising:
   a code generator which generates a spreading code for use in a despreading operation;
   a despreading unit which receives as inputs thereto a received signal as an object of the despreading and the spreading code generated by the code generator and conducting a plurality of despreading for the received signal for a plurality of timing in a concurrent fashion;
   an extracting circuit which extracts highly reliable ones from a plurality of correlation values outputted from the despreading unit;
   a representative value determining circuit which calculates a path location representative value using path locations of correlation values corresponding to at least two paths in the plurality of extracted correlation values;
   a control circuit which controls code generation timing of the code generator according to the path location representative value determined by the representative value determining circuit; and
   a demodulating unit which combines with each other the correlation values extracted by the extracting circuit and thereby demodulating data.

2. A mobile terminal in accordance with claim 1, wherein: the despreading unit is a matched filter which produces a correlation value at each timing obtained by equally dividing width of a window of the matched filter; and
   the extracting circuit extracts correlation values of which an average value averaged for a period of observation time is equal to or more than a threshold value.

3. A mobile terminal in accordance with claim 2, wherein an interval of the timing is $1/j$ (j is an integer) of a chip length of the spreading code.

4. A mobile terminal in accordance with claim 1, wherein the representative value determining circuit determines a path location representative value through a calculation of center of gravity of the extracted correlation values.

5. A mobile terminal in accordance with claim 1, wherein the control circuit includes a loop filter and a clock controller, wherein:
   the loop filter produces a control signal according to the representative value; and
   the clock controller controls the code generator to keep synchronization between the received signal and the spreading code according to the control signal.

6. A base station, comprising at least one receiver for conducting processing of reception of a signal from a mobile terminal, wherein the receiver includes:
   a code generator which generates a spreading code for use in a despreading operation;
   a despreading unit which receives as inputs thereto a received signal as an object of the despreading and the spreading code generated by the code generator and conducting a plurality of despreading for the received signal for a plurality of timing in a concurrent fashion;
   an extracting circuit which extracts, from a plurality of correlation values, correlation values of which an average value averaged for a period of observation time is equal to or more than a threshold value;
   a representative value determining circuit which calculates a path location representative value using path locations of correlation values corresponding to at least two paths in the plurality of extracted correlation values;
   a control circuit which controls code generation timing of the code generator according to the path location representative value determined by the representative value determining circuit; and
   a demodulating unit which combines with each other the correlation values extracted by the extracting circuit and thereby demodulating data.

7. A base station in accordance with claim 6, wherein: the despreading unit is a matched filter which produces a correlation value at each timing obtained by dividing width of a window of the matched filter by n.

8. A base station in accordance with claim 7, wherein an interval of the timing is $1/i$ (i is an integer) of a chip length of the spreading code.

9. A base station in accordance with claim 6, wherein the representative value determining circuit determines a path location representative value through a calculation of center of gravity of the extracted correlation values.

10. A base station in accordance with claim 6, wherein the control circuit includes a loop filter and a clock controller, wherein:
    the loop filter produces a control signal according to the representative value; and
    the clock controller controls the code generator to keep synchronization between the received signal and the spreading code according to the control signal.

11. A synchronization control method, comprising the steps of:
    obtaining a despread signal according to a received spectrum-spread signal and an inputted spreading code;
    obtaining a delay profile for the despread signal;
    conducting a rake combining for the despread signal according to the delay profile obtained and thereby producing a demodulated signal;
    calculating a representative value representing spread code phases of a plurality of paths according to a plurality of correlation values and timing thereof obtained from the obtained delay profile; and
    conducting a control operation for a tracking of synchronization between the inputted received signal and the spreading code according to the calculated representative value.

12. A synchronization control method in accordance with claim 11, wherein the representative value is calculated using an odd function having as an axis of symmetry a time window center with respect to timing.

13. A synchronization control method in accordance with claim 11, wherein the representative value is calculated using a function uniformly changing with respect to change of a correlation value at certain timing.

14. A synchronization control method in accordance with claim 11, wherein the representative value is timing of a center of path power of a plurality of paths.

15. A synchronization control method in accordance with claim 14, wherein in calculation of the timing of a center of path power of a plurality of paths, a time width to obtain an average of each path power to be used as a power weight for a path location is shorter than a time width to obtain an average of a summation of all received power to normalize timing of the center of path power.

16. A synchronization control method in accordance with claim 11, wherein the representative value is calculated by dividing by a summation of delay profiles averaged with respect to time a summation of path location information obtained by multiplying delay profiles in a power order for a plurality of paths by timing thereof.

17. A synchronization control method in accordance with claim 11, wherein the representative value is calculated according to a delay profile selected by assuming that a valid correlation value is beforehand obtained for a delay profile averaged with respect to time when the profile is equal to more than a predetermined threshold value.

18. A synchronization control method in accordance with claim 17, wherein in calculation of the representative value, a value representing spread code phases of a plurality of paths is calculated according to a plurality of detected timing and when the value representing the difference between paths exceeds a predetermined value, tracking of synchronization for either one of the paths on a window end and in a proximity of the window end is abandoned.

19. A synchronization control method in accordance with claim 18, wherein the value representing spread code phases of a plurality of paths is a differential deviation.

20. A synchronization control method in accordance with claim 11, wherein in calculation of the representative value, power of the received signal is measured for both of a first time window width to conduct despreading and a second time window width obtained by reducing the first time window width and when a ratio of power received for the second time window width to power received for the first time window width is less than a predetermined ratio, tracking of synchronization for either one of the paths on a window edge and in a proximity of the window edge is abandoned.

21. A receiver, comprising:
an inputting circuit which produces a despread signal according to a received spectrum-spread signal and an inputted spreading code;
a delay profile measuring circuit which produces a delay profile for the despread signal from the inputting circuit;
a data symbol demodulating circuit which conducts a rake combining, according to the delay profile produced by the profile measuring circuit, for the despread signals from the inputting circuit and thereby producing a demodulated signal;
a representative value calculating circuit which calculates a representative value representing spread code phases of a plurality of paths according to a plurality of correlation values and timing thereof obtained from the delay profile produced by the profile measuring circuit; and
a clock control circuit which achieves a control operation to conduct a tracking of synchronization, according to the representative value from the representative value calculating circuit, between the received signal and the spreading code inputted to the inputting circuit.

22. A receiver in accordance with claim 21, wherein:
the inputting circuit includes a matched filter capable of simultaneously conducting a plurality of despreading for a plurality of timing; and
the representative value calculating circuit changes, when the matched filter is receiving a signal in which a plurality of delayed waves of different timing detected in a window are combined with each other and timing of a delayed wave having other than maximum intensity changes, the representative value according to the change of the timing and thereby achieving a control operation to change timing of a correlation value outputted from the matched filter.

23. A receiver in accordance with claim 21, wherein:
the inputting circuit includes a matched filter capable of simultaneously conducting a plurality of despreading for a plurality of timing; and
the representative value calculating circuit changes, when the matched filter is receiving a signal in which a plurality of delayed waves of different timing detected in a window are combined with each other and intensity of delayed wave having other than maximum intensity changes within a range in which the intensity does not become the maximum intensity, the representative value according to the change of the timing and thereby changing timing of a correlation value outputted from the matched filter.

24. A receiver in accordance with claim 23, further including a loop filter including integrating means, variable coefficient generating means, and an adding means, wherein:
the loop filter adds, by the adding means using predetermined weights, a first value obtained by integrating by the integrating means a result attained by multiplying a representative value from the representative value calculating circuit by a square of a coefficient generated by the variable coefficient generating means to a second value obtained by multiplying the representative value by a coefficient generated by the variable coefficient generating means; and
the clock control circuit controls, using an output from the loop filter, variable frequency oscillating means or a variable frequency divider arranged therein.

25. A receiver in accordance with claim 14, wherein the variable coefficient generating means gradually reduces the coefficient value, beginning at a coefficient value at acquisition of synchronization.

* * * * *